Nov. 22, 1927.
H. E. PLUNKETT
1,650,234
CONNECTER FOR ELECTRIC CONDUITS
Filed Jan. 11, 1923
2 Sheets-Sheet 1
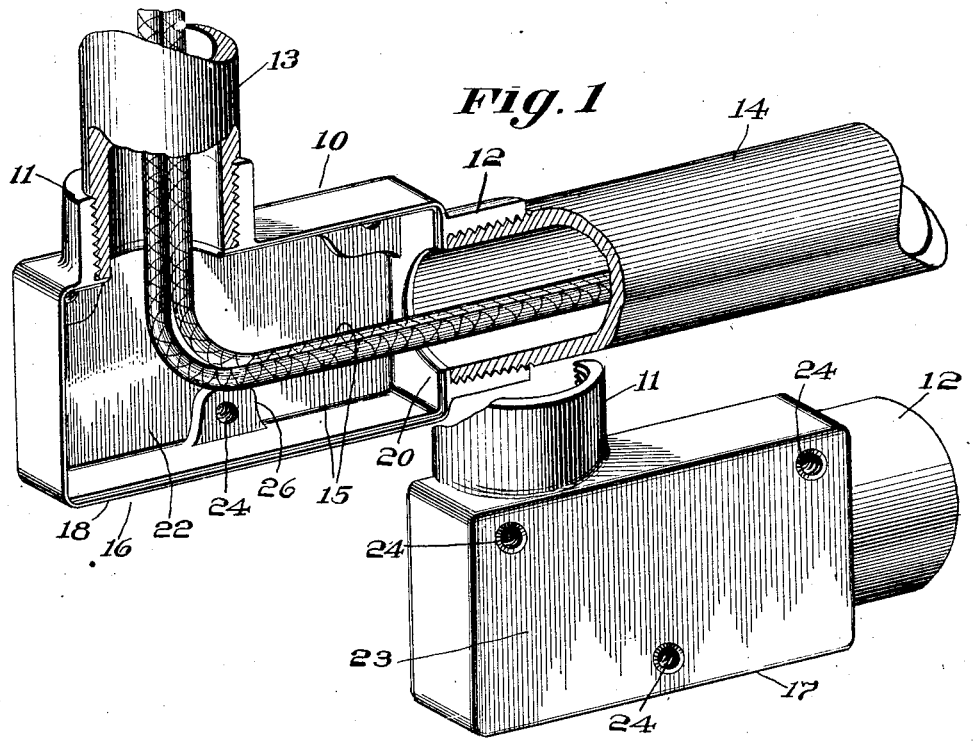
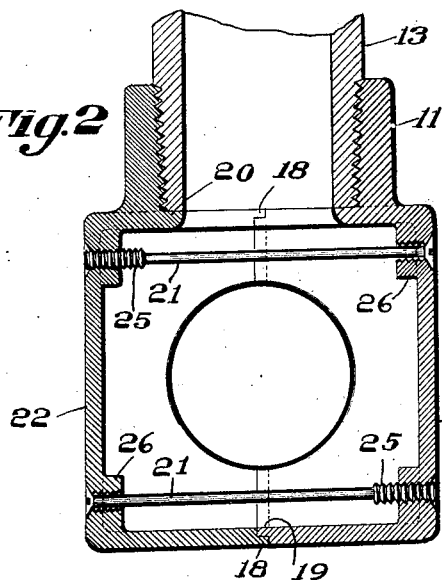
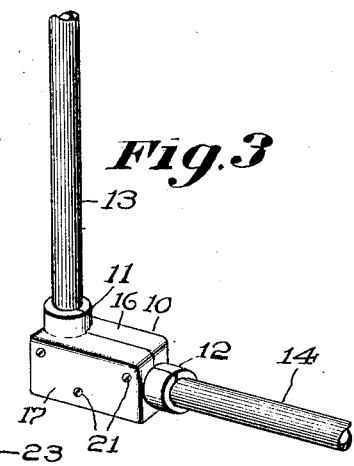
INVENTOR:
Hugh E. Plunkett
BY Robt. T. Hawks
ATTORNEY Nov. 22, 1927.
H. E. PLUNKETT
1,650,234
CONNECTER FOR ELECTRIC CONDUITS
Filed Jan. 11, 1923
2 Sheets-Sheet 2
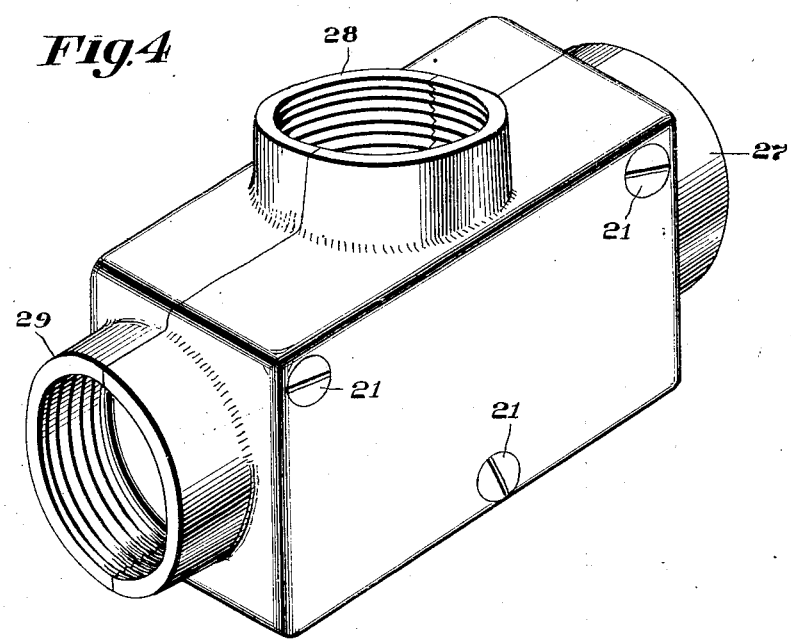
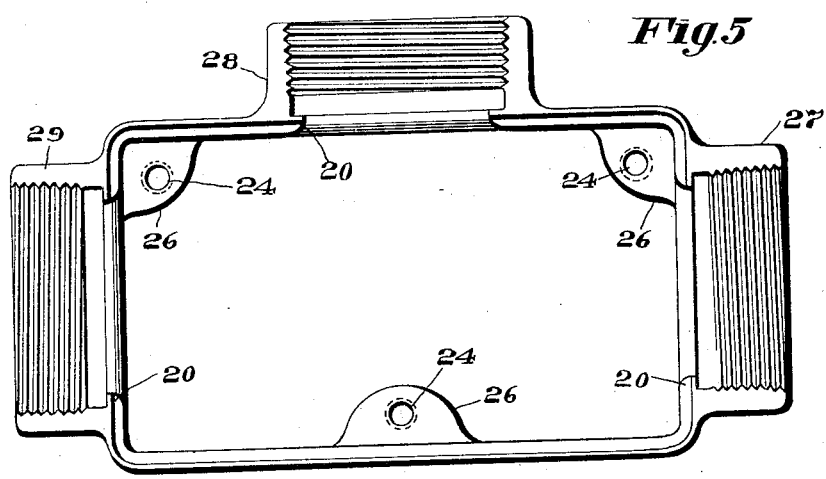
INVENTOR
Hugh E. Plunkett
BY Rob't O. Hains
ATTORNEY Patented Nov. 22, 1927.

1,650,234

UNITED STATES PATENT OFFICE.

HUGH E. PLUNKETT, OF NASHUA, NEW HAMPSHIRE.

CONNECTER FOR ELECTRIC CONDUITS.

Application filed January 11, 1923. Serial No. 611,946.

The invention to be hereinafter described relates to a box connecter or coupling for connecting conduits or pipes.

Electric conductors for buildings are now usually installed in metal conduits or pipes to protect the conductors from injury by water, rodents or from other sources of destruction, and to reduce the fire hazard. The conductors are drawn through the metal pipes by the workmen engaged in installing the electric wiring, and no serious difficulty is experienced in inserting wires through, or removing them from alined pipes, but when the pipes are disposed at an angle to each other and are connected by an elbow or other form of connecter, serious difficulty is experienced in drawing the wires through the pipes at the point where the bend in the wires occurs.

Various types of connecters have been proposed heretofore to lessen the difficulty experienced in drawing wires through connected angularly disposed pipes, and some of them are fairly satisfactory when small flexible wires are being installed, but they are not satisfactory when the wires being drawn through the connected pipes are relatively large and stiff.

In one well-known type of connecter a box is provided having one or more removable side walls through which access may be had to the wires at the point where they bend in passing from one pipe to another. It is difficult, however, to manipulate the wires through such opening, and since it may be necessary to install the box coupling with any one of its sides adjacent a wall of a building, it often happens that the removable side wall of a particular coupling lies in an inaccessible position, and as a result it is necessary to provide right and left handed box couplings of this type so that if one removable side wall of the coupling lies adjacent a wall of a building the opposite side of the box may be removed.

Having the above matters in mind, one important feature of the present invention resides in a box connecter which is split centrally between its walls to form two separate box sections that may be secured in rigid engagement with angularly disposed or alined pipes after the wires have been inserted through the pipes. As a result of this construction the wires may be inserted through the pipes either before or after the pipes are installed in the angularly disposed or alined position, and then the box connecter may be secured in place to connect the pipes and to form a protecting housing for the wires where they extend from one pipe into the other.

Another important feature of the invention resides in means by which the box sections may be secured together by inserting the securing bolts from either side of the box. This is important because if either side of the box lies adjacent a wall of the building, the securing bolts may be inserted through the opposite side of the box.

Another feature of the invention resides in a box connecter formed of two box sections which are so constructed that they may be assembled to form a water tight box.

Other features of the invention and novel combination of parts in addition to the above will be hereinafter described in connection with the accompanying drawings which illustrate one good practical form thereof.

In the drawings:

Fig. 1 is a perspective view of a connecter for conduits constructed in accordance with the present invention and showing the box sections of the connecter spaced apart;

Fig. 2 is a vertical sectional view taken transversely through the connecter and through one of its conduit receiving sockets;

Fig. 3 on a reduced scale is a perspective view of the connecter of Fig. 1 showing the box sections assembled;

Fig. 4 is a perspective view showing the invention applied to a different type of box connecter; and Fig. 5 is a plan view of the interior of one of the box sections of Fig. 4.

In the embodiment of the invention shown in Figs. 1, 2 and 3, the connecter is in the form of a box 10 having sockets 11 and 12 extending from different faces thereof, and metal pipes or conduits 13 and 14 are shown as connected by the connecter or box 10.

The configuration of the box 10 may be varied as desired but the walls of the same preferably are disposed at right angles to each other so that the walls of the box will fit well in the corner of a building, and will rest firmly against the wall or walls of a building. The sockets 11 and 12 may extend outwardly from any of the walls of the box, and these sockets preferably are threaded internally as shown and have threaded engagement with the conduits 13 and 14.

As above pointed out it is important that the box or connecter 10 be so constructed that it may be applied to the conduits 13 and 14 and removed therefrom after the conduits have been secured in place in the building. This is desirable in order that the electric wires 15 may be inserted through the conduits 13 and 14 before the connecter 10 is applied. To this end the connecter or box 10 is split centrally between its lateral walls so that the split of the box extends centrally through the sockets 11 and 12 and forms the separate box sections 16 and 17, as will be apparent from the drawings. This enables the sections 16 and 17 to be applied to the opposite sides of the conduits 13 and 14 to be connected so that the threads of the sockets will tightly embrace the threaded ends of the conduits, whereupon the box sections may be firmly secured together in a manner to be described.

As a result of the present construction either of the conduits 13 or 14 may be moved freely relative to the other during the insertion of the wires 15 therethrough, and after the wires are introduced through the conduits the latter may then be either temporarily or permanently secured in place before the connecter 10 is applied to connect the ends of the conduits.

In many cases it is desirable that the connecter 10 be water tight so that in case the connecter and conduits become wet the water will be prevented from reaching the wires 15 to damage or short circuit them. The box sections 16 and 17, therefore, may have cooperating flanges 18 and 19 formed upon their adjacent edges so that one will fit inside the other as clearly shown in Fig. 2. These flanges serve also to hold the box sections in proper alinement, and any likelihood of water entering between these flanges may be prevented by the use of white lead or other material to make the joint tight.

Each of the box sections 16 and 17 preferably has the walls thereof formed integral to make the same water tight, and since the connecters 10 may often be subjected to considerable strain they preferably should be made of metal. It is desirable to provide an annular flange 20 at the base of each socket 11 and 12 that extends inwardly flush with the internal bore of the conduits. These flanges form abutments against which the ends of the conduits may rest and prevent the insulated wires 15 from coming in contact with the ends of the conduits. The flanges serve also to increase the tightness of the joint, and one edge of the flanges may be rounded, as shown, to avoid damaging the insulation upon the wires 15.

It is often desirable to mount the conduits 13 and 14 in the angles formed by two walls of a room or building, and to mount the connecters 10 in the corner of rooms or buildings. As the result, two or three walls of a connecter 10 are often inaccessible, and it is therefore important that the means for securing the box sections 16 and 17 together be so constructed that it may be manipulated from either sides of the box 10. The securing means should also be so constructed that it will not protrude from the walls of the box.

Simple but satisfactory means to this end consists of bolts 21 which are inserted through a wall of one of the box sections 16, 17 and have threaded engagement with a wall of the opposite section, and since it is desirable that the bolts 21 be insertable from either side of the box 10, the opposite walls 22 and 23 are provided with alined threaded holes 24, and the bolts 21 have threaded ends 25 and reduced body portions as shown. As a result of this construction the bolts may be inserted from either side of the box through one threaded hole 24 and into threaded engagement with the alined hole of the other box section, and the reduced body portion is of a size to slide freely in either threaded hole. The holes 24 may be countersunk, as shown, to receive the heads of the bolts 21, and lugs 26 may be formed upon the inner face of the walls 22 and 23 to increase the depth of the threaded holes 24.

In Figs. 4 and 5, a box connecter is shown of the T-type in which the conduit receiving sockets 27, 28 and 29 extend from three faces of the box instead of from two faces as in Figs. 1, 2 and 3, and the split of the box extends centrally through all three sockets, as shown. All the features of Figs. 1, 2 and 3, above described, may be embodied in the type of box shown in Figs. 4 and 5.

As a result of the present construction, it matters not which face 22, 23 of the box lies adjacent a wall of the building, since the securing bolts 21 may be inserted through the opposite wall to secure the box sections together.

What is claimed is:

1. A connecter for connecting angularly disposed metal conduits, comprising a hollow, six-sided, metal box split centrally between its lateral walls to form two separate box sections, internally threaded conduit receiving sockets extending from two of the angularly disposed walls of the box, each socket having the split of the box extending longitudinally therethrough that the box sections may be removed without disturbing the conduits connected by the box, and means for securing the box sections together to form a box, including alined threaded holes through each of said lateral walls, and bolts having threaded end portions and reduced body portions that the bolts may be inserted from either side of the box through one threaded hole and into threaded engagement with the alined hole of the opposite box section.

2. A connecter for connecting angularly disposed metal conduits, comprising a box having oppositely disposed side walls and split centrally between its lateral walls to form two separate box sections, conduit receiving sockets extending from two angularly disposed walls of the box, each socket having the split of the box extending longitudinally therethrough that the box sections may be removed without disturbing the conduits connected by the box, and means for securing the box sections together to form a box, including alined threaded holes in each of said lateral walls, and bolts having threaded end portions and reduced body portions that the bolts may be inserted from either side of the box through one threaded hole and into threaded engagement with the alined hole of the opposite box section.

3. A connecter for connecting angularly disposed metal conduits, comprising a hollow metal box having opposite side and end walls and split centrally between its lateral walls to form two separate box sections, conduit receiving sockets extending from two walls of the box, each socket having the split of the box extending longitudinally through the socket to divide them in halves so that the box sections may be secured to the conduit with the threads of the sockets engaging the threaded ends of the conduits after the conduits are installed, and means for clamping the box sections together, including aligned threaded holes in the opposite lateral walls, and bolts having threaded end portions and reduced body portions that the bolts may be inserted through the threaded holes at each side of the box and into threaded engagement with the holes at the opposite sides of the box.

4. A connecter for connecting metal conduits, comprising a box having oppositely disposed side walls and split centrally between its lateral walls to form two separate box sections, conduit receiving sockets extending from two walls of the box, each socket having an annular flange at its base that extends inwardly flush with the internal bore of the conduit and forms an abutment for the end of the conduit, and means for securing the box sections together to form a box, including alined threaded holes in each of said lateral walls, and bolts having threaded end portions and reduced body portions that the bolts may be inserted from either side of the box through one threaded hole and into threaded engagement with the alined hole of the opposite box section.

5. A connecter for connecting angularly disposed metal conduits, comprising a substantially rectangular metal box split centrally between its lateral walls to form two separate box sections, conduit receiving sockets extending from an end and a side wall, each socket having the split of the box extending longitudinally therethrough that the box sections may be removed without disturbing the conduits connected by the box, each box section having all its walls formed integrally to exclude moisture, and means for clamping the box sections together, including alined threaded holes in each of said lateral walls, and bolts having threaded end portions and reduced body portions that the bolts may be inserted from either side of the box through one threaded hole and into threaded engagement with the alined hole of the opposite box section.

6. A connecter for connecting metal conduits, comprising a box having oppositely disposed walls and split centrally between its lateral walls to form two separate box sections, conduit receiving sockets extending from two walls of the box and each having the split of the box extending longitudinally therethrough that the box sections may be removed without disturbing the conduits connected by the box, and means for securing the box sections together to form a box, including alined threaded holes in each of said lateral walls, and bolts having threaded end portions and reduced body portions that the bolts may be inserted from either side of the box through one threaded hole and into threaded engagement with the alined hole of the opposite box section.

7. A connecter for connecting metal conduits, comprising a box having oppositely disposed walls and split centrally between its lateral walls to form two separate box sections, conduit receiving sockets extending from two walls of the box and each having the split of the box extending longitudinally therethrough that the box sections may be removed without disturbing the conduits connected by the box, overlapping portions upon the edges of the box sections to hold one section from lateral displacement relative to the other, and means for securing the box sections together, including alined threaded holes in each of said lateral walls and bolts having threaded end portions and reduced body portions that the bolts may be inserted from either side of the box to extend loosely through one threaded hole and into threaded engagement with the alined hole of the opposite box section.

In testimony whereof, I have signed my name to this specification.

HUGH E. PLUNKETT.